US009128595B2

(12) United States Patent
Müller et al.

(10) Patent No.: US 9,128,595 B2
(45) Date of Patent: Sep. 8, 2015

(54) MANAGING DATA CONTENT ON A COMPUTING DEVICE

(75) Inventors: Benjamin Müller, Berlin (DE); Aurélien Descamps, Ablis (FR)

(73) Assignee: Business Objects Software Ltd., Dublin (IE)

( * ) Notice: Subject to any disclaimer, the term of this patent is extended or adjusted under 35 U.S.C. 154(b) by 268 days.

(21) Appl. No.: 13/600,554

(22) Filed: Aug. 31, 2012

(65) Prior Publication Data

US 2014/0062897 A1 Mar. 6, 2014

(51) Int. Cl.
| | |
|---|---|
| G06F 7/02 | (2006.01) |
| G06F 17/30 | (2006.01) |
| G06F 3/0484 | (2013.01) |
| G06Q 30/02 | (2012.01) |
| G06F 17/24 | (2006.01) |
| G06F 3/0482 | (2013.01) |
| G06Q 10/10 | (2012.01) |
| G06T 11/20 | (2006.01) |

(52) U.S. Cl.
CPC .......... *G06F 3/04847* (2013.01); *G06F 3/0482* (2013.01); *G06F 17/246* (2013.01); *G06F 17/30339* (2013.01); *G06F 17/30572* (2013.01); *G06Q 10/10* (2013.01); *G06Q 30/0201* (2013.01); *G06Q 30/0282* (2013.01); *G06T 11/206* (2013.01); *G06F 2203/04807* (2013.01)

(58) Field of Classification Search
CPC .......... G06Q 30/0201; G06Q 30/0282; G06F 17/30333; G06F 17/30339; G06F 17/30; G06F 17/30572; G06F 17/30592
See application file for complete search history.

(56) References Cited

U.S. PATENT DOCUMENTS

| | | | | |
|---|---|---|---|---|
| 5,915,257 | A * | 6/1999 | Gartung et al. | 715/210 |
| 8,127,223 | B2 * | 2/2012 | Becerra et al. | 715/212 |
| 8,200,618 | B2 * | 6/2012 | Gibson et al. | 707/603 |
| 2006/0287998 | A1 * | 12/2006 | Folting et al. | 707/5 |
| 2007/0299860 | A1 * | 12/2007 | Westman et al. | 707/102 |
| 2011/0248927 | A1 * | 10/2011 | Michaelis et al. | 345/173 |
| 2013/0106830 | A1 * | 5/2013 | de Loera et al. | 345/419 |
| 2013/0275905 | A1 * | 10/2013 | Bhaskaran et al. | 715/771 |
| 2013/0298085 | A1 * | 11/2013 | Kritt et al. | 715/863 |

OTHER PUBLICATIONS

"Pie menu," Wikipedia, The Free Encyclopedia, May 2, 2012, retrieved from <http://en.wikipedia.org/w/index.php?title=Pie_menu&oldid=490317128>, 5 pages.

(Continued)

*Primary Examiner* — Bruce Moser
(74) *Attorney, Agent, or Firm* — Fish & Richardson P.C.

(57) ABSTRACT

Techniques for managing content on a computing device include identifying a data object including business data values defined in a structured format, the structured format including the business data values defined by two or more first dimensions and one or more second dimensions; determining a particular first dimension of the two or more first dimensions and a particular second dimension of the one or more second dimensions; generating a display grid that is displayable on a computing device, the display grid including a portion of the business data values corresponding to the particular first dimension and the particular second dimension; and preparing the display grid for display on the computing device.

26 Claims, 7 Drawing Sheets

(56) References Cited

OTHER PUBLICATIONS

Hsiao, et al.; "Data Visualization on Web-based OLAP"; DOLAP 2011, Oct. 28, 2011, Glasgow, Scotland, UK, pp. 75-82, 2011, 8 pages.

Maniatis; "The Case for Mobile OLAP"; National Technical University of Athens, Department of Electrical and Computer Engineering, Knowledge and Database Systems Laboratory, 2005, 10 pages.

Callahan, et al.; "An Empirical Comparison of Pie vs. Linear Menus"; Computer Science Department, University of Maryland, College Park, Maryland 20742, pp. 95-100, 1988, 6 pages.

Cuzzocrea, et al.; "OLAP Visualization: Models, Issues, and Techniques"; OLAP Visualization, Section: Data Cube & OLAP; pp. 1439-1446; 2009; 8 pages.

Maniatis, et al.; "Advanced Visualization for OLAP"; DOLAP 2003, Nov. 7, 2003, New Orleans, Louisiana, pp. 9-16, 2003, 8 pages.

* cited by examiner

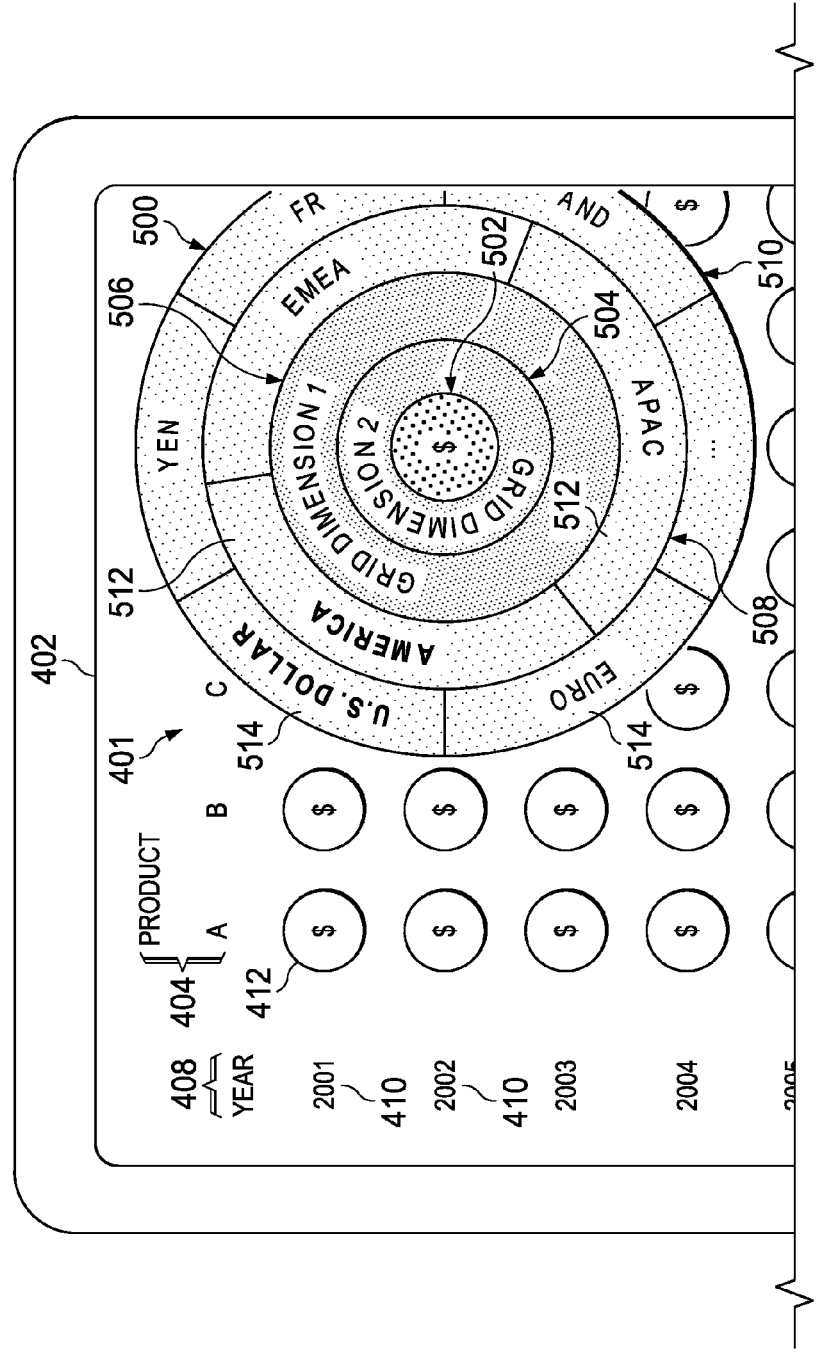

MANAGING DATA CONTENT ON A COMPUTING DEVICE

TECHNICAL BACKGROUND

This disclosure relates to managing data content on a computing device and, more particularly, managing a display of content on the computing device (e.g., a mobile device).

BACKGROUND

Business users of software in a business enterprise may access a virtual workspace (or other content) through a portal to browse, view, modify, and/or otherwise manipulate data related to the business enterprise. Such data may include a variety of information in many different forms, such as sales data, revenue data, human resources information, business hierarchy information, and otherwise. Graphs, tables, charts, electronic communications, web services, reports, and other forms of data, may be viewable in the user's workspace. For example, conventional presentation of data in the form of multidimensional data sets may be displayed in a grid (e.g., a stacked crosstab). This is a tabular view with more than one dimension on each of the horizontal and vertical axis. The size of this grid increases largely with each dimension added. Particularly, the labeling of the axes may be highly repetitive due to the projection of a multidimensional space in a two-dimensional grid. As a result, the traditional presentation of multidimensional data sets may not be applicable on form-constrained mobile devices like smartphones or tablets.

SUMMARY

This disclosure describes general implementations of systems, methods, apparatus, and computer-readable media for managing content on a computing device that include identifying a data object including business data values defined in a structured format, the structured format including the business data values defined by two or more first dimensions and one or more second dimensions; determining a particular first dimension of the two or more first dimensions and a particular second dimension of the one or more second dimensions; generating a display grid that is displayable on a computing device, the display grid including a portion of the business data values corresponding to the particular first dimension and the particular second dimension; and preparing the display grid for display on the computing device.

In a first aspect combinable with any of the general implementations, the computing device includes a mobile device that includes one of a smartphone, a tablet, a PDA, or a cellular phone.

In a second aspect combinable with any of the previous aspects, determining a particular first dimension of the two or more first dimensions and a particular second dimension of the one or more second dimensions includes determining an outer level first dimension of the two or more first dimensions; determining an inner level first dimension of the two or more first dimensions, the inner level first dimension including a plurality of members that include a subset of the outer level first dimension; setting the inner level first dimension as the particular first dimension; determining an outer level second dimension of the one or more second dimensions; determining an inner level second dimension of the one or more second dimensions, the inner level second dimension including a plurality of members that include a subset of the outer level second dimension; and setting the inner level second dimension as the particular second dimension.

In a third aspect combinable with any of the previous aspects, the outer level first dimension includes a plurality of members, and the outer level second dimension includes a plurality of members.

A fourth aspect combinable with any of the previous aspects further includes receiving a first command from a user of the computing device; in response to receiving the first command, displaying a context interface on the computing device, the context interface including the particular first and second dimensions and at least a portion of the plurality of members of the outer level first dimension and at least a portion of the plurality of members of the outer level second dimension.

A fifth aspect combinable with any of the previous aspects further includes receiving a second command from the user of the computing device through the context interface; in response to receiving the second command, switching the particular first dimension with one of the plurality of members of the outer level first dimension; regenerating the display grid that is displayable on the mobile device, the display grid including a portion of the business data values corresponding to the switched first dimension and the particular second dimension; and preparing the regenerated display grid for display on the computing device.

In a sixth aspect combinable with any of the previous aspects, receiving a second command from the user of the computing device through the context interface includes receiving rotational contact on a touchscreen at or near a portion of the context interface.

A seventh aspect combinable with any of the previous aspects further includes receiving a third command from the user of the computing device through the context interface; in response to receiving the third command, switching the particular first dimension that includes the inner level first dimension with the outer level first dimension; regenerating the display grid that is displayable on the computing device, the display grid including a portion of the business data values corresponding to the switched first dimension and the particular second dimension; and preparing the regenerated display grid for display on the computing device.

In an eighth aspect combinable with any of the previous aspects, receiving a third command from the user of the computing device through the context interface includes receiving pinching contact on a touchscreen at or near a portion of the context interface toward a center of the context interface.

In a ninth aspect combinable with any of the previous aspects, receiving a first command includes receiving contact on a touchscreen of the computing device at or near a particular business data value displayed in the display grid.

In a tenth aspect combinable with any of the previous aspects, the context interface includes a pie menu interface that includes a center portion that includes the particular business data value; a first ring that circumscribes the center portion and includes the particular first dimension; a second ring that circumscribes the first ring and includes the particular second dimension; and a third ring that circumscribes at least one of the first and second rings and includes one of the first dimensions other than the particular first dimension.

In an eleventh aspect combinable with any of the previous aspects, the one or more second dimensions include two or more second dimensions.

Various embodiments of the present disclosure may provide one or more of the following features. For example, a data display (e.g., a two-dimensional grid representing one dimension per axis) may be generated from a complex data object (e.g., a multi-dimensional grid representing more than one dimension per axis). The data display may be prepared for a mobile communication device with a limited display area, such as, for example, a smartphone, tablet, personal digital assistant (PDA), cell phone, or other mobile device. Further, the data display may be adjustable to ensure that a complete set of data contained in the data object is displayable in the data display. As another example, the mobile device user may adjust the data display (e.g., to display one or more dimensions of the data object) through a user interface that is visually offset from the data display (e.g., a context menu). Further, a size of the data object (e.g., a total number of dimensions, members, and/or values contained therein) may not constrain the data display on the mobile device.

These general and specific aspects may be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DESCRIPTION OF DRAWINGS

FIGS. 5A-5C illustrate an example mobile device displaying modified views of a portion of business data and a context interface.

DETAILED DESCRIPTION

This specification describes systems, methods, apparatus, and computer-readable media for managing content on a computer, such as a mobile computing or communication device. In some implementations, a data object that contains business data in a structured format, e.g., a spreadsheet, grid-based data, or other data object, is identified (e.g., stored on the mobile device or accessible to the mobile device through a network). The data object includes the business data defined by two or more dimensions (e.g., categories or labels). For example, in the case of a spreadsheet object, the data may be defined in a multidimensional format, such that a particular axis (e.g., a horizontal or vertical axis) of the object includes two or more dimensions. Two particular dimensions (e.g., one vertical dimension and one horizontal dimension) may be selected from the multiple dimensions of one or both axes. In some implementations, such particular dimensions may be determined according to a particular level of the dimension. For instance, in the case of multiple, or stacked, dimensions, members of an inner dimension are repeated within each member of an outer dimension. Once the two particular dimensions are identified, a display grid that includes at least some of the business data defined by the particular dimensions is generated and prepared for display on the mobile device.

Figure 1:
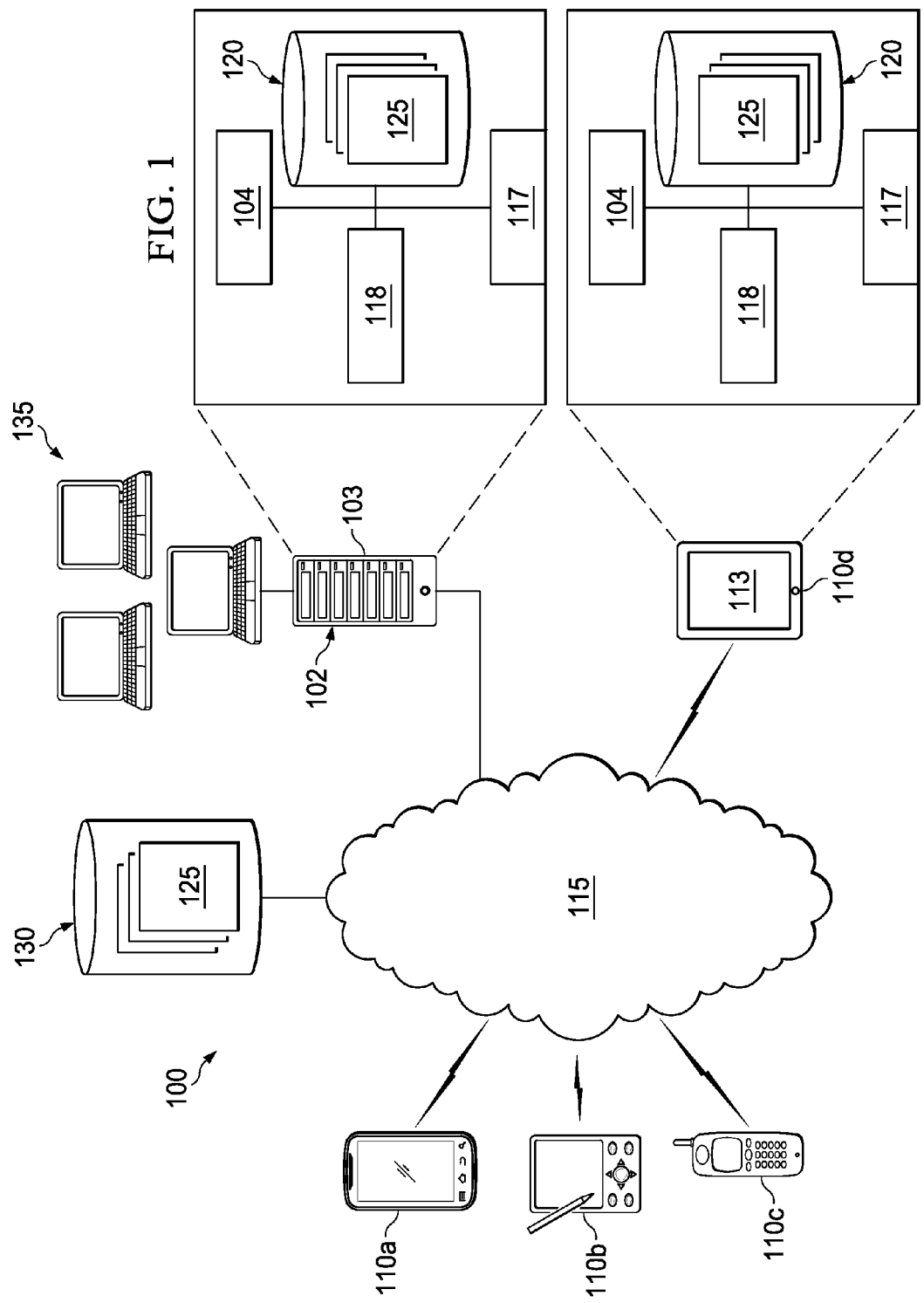
FIG. 1 illustrates an example distributed computing system operable to manage data content on a mobile device.

FIG. 1 illustrates an example distributed computing system 100 operable to focus on contextually-relevant content in a mobile communication device 110. Specifically, the illustrated environment 100 includes or is communicably coupled with a computing system 102 (e.g., an enterprise computing system, on demand computing system, or other server based system), a repository 130, one or more client computing devices 135 ("clients"), and one or more mobile communication devices 110 (shown here as distinct mobile devices 110a-110d and referred to as "mobile device 110"), at least some of which communicate across a network 115.

The computing system 102 includes a server 103. In general, the server 103 is any server that stores one or more hosted applications, where at least a portion of the hosted applications are executed via requests and responses sent to users or clients within and communicably coupled to the illustrated environment 100 of FIG. 1. In some instances, the server 103 may store a plurality of various hosted applications, while in other instances, the server 103 may be a dedicated server meant to store and execute only a single hosted application. In some instances, the server 103 may comprise a web server, where the hosted applications represent one or more web-based applications accessed and executed via network by the clients 135 or the mobile device 110 to perform the programmed tasks or operations of the hosted application.

At a high level, the server 103 comprises an electronic computing device operable to receive, transmit, process, store, or manage data and information associated with the environment 100. Specifically, the server 103 illustrated in FIG. 1 is responsible for receiving application requests from one or more client applications associated with the clients 135 or the mobile device 110 of environment 100 and responding to the received requests by processing said requests in the associated hosted application, and sending the appropriate response from the hosted application back to the requesting client application. In addition to requests from the clients 135 and the mobile device 110 illustrated in FIG. 1, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server 103, environment 100 can be implemented using two or more servers 103, as well as computers other than servers, including a server pool. Indeed, server 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 103 may be adapted to execute any operating system, including Linux, UNIX, Windows, Mac OS, or any other suitable operating system. According to one embodiment, server 103 may also include or be communicably coupled with a mail server.

The server 103 of the computing system 102 includes a data focus module 104. At a high level, the data focus module 104, in some implementations, may be executed to identify a data object that contains business data in a structured format, e.g., a spreadsheet, grid-based data, that includes at least one multidimensional axis (e.g., a vertical or horizontal axis in the case of a spreadsheet). The data focus module 104 operates to select two particular dimensions (e.g., one vertical dimension and one horizontal dimension) from the multiple dimensions of one or both axes. In some implementations, such particular dimensions may be determined by the content focus module 104 according to a particular level of the dimension. Once the two particular dimensions are selected by the data focus module 104, the module 104 generates a display grid that includes at least some of the business data defined by the particular dimensions and prepares for display on the mobile device. The data focus module 104 can be implemented by and stored by any combination of the computing system 102, the repository 130, the clients 135, and/or the mobile device 100. For example, as illustrated, all or a portion of the data focus module 104 may be implemented on one or both of the computing system 102 (e.g., on a server side) or the mobile device (e.g., on a client side).

The illustrated server 103 further includes an interface 117, a processor 118, and a memory 120. The interface 117 is used by the server 103 for communicating with other systems in a distributed environment (including within the environment 100) connected to the network 115 (e.g., the clients 135 or the mobile device 110, as well as other systems communicably coupled to the network 115). Generally, the interface 117 comprises logic encoded in software and/or hardware in a suitable combination and operable to communicate with the network 115. More specifically, the interface 117 may comprise software supporting one or more communication protocols associated with communications such that the network 115 or interface's hardware is operable to communicate physical signals within and outside of the illustrated environment 100.

As illustrated in FIG. 1, the server 103 includes a processor 118. Although illustrated as a single processor 118 in FIG. 1, two or more processors may be used according to particular needs, desires, or particular embodiments of the environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of the server 103. Specifically, the processor 118 executes the functionality required to receive and respond to requests from the clients 135 and/or the mobile device 110, such as, for example, according to software instructions from the data focus module 104.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The server 103 also includes a memory 120. The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the computing system 102. Additionally, the memory 120 may include any other appropriate data, such as virtual private network (VPN) applications, firmware logs and policies, firewall policies, a security or access log, print or other reporting files, as well as others.

As illustrated, for example, the memory 120 (as well as the repository 130 and mobile device 110$d$ which includes a memory 120) may store and/or reference one or more data objects 125. In some implementations, each data object 125 may be a crosstab, e.g. a summarization of a measure of a data cube (e.g., an OLAP data cube) based on two dimensions labeled as row and column axes. In a crosstab, data is arranged in row and columns. The rows are defined by a vertical axis that is a dimension that includes members. Each member defines a row. The same applies for the columns and a horizontal axis. At the intersection of a row and a column is a cell. The cell typically includes a value that corresponds to the intersection of the members that define it. The value is an aggregation of the measure for the table.

Figure 3:
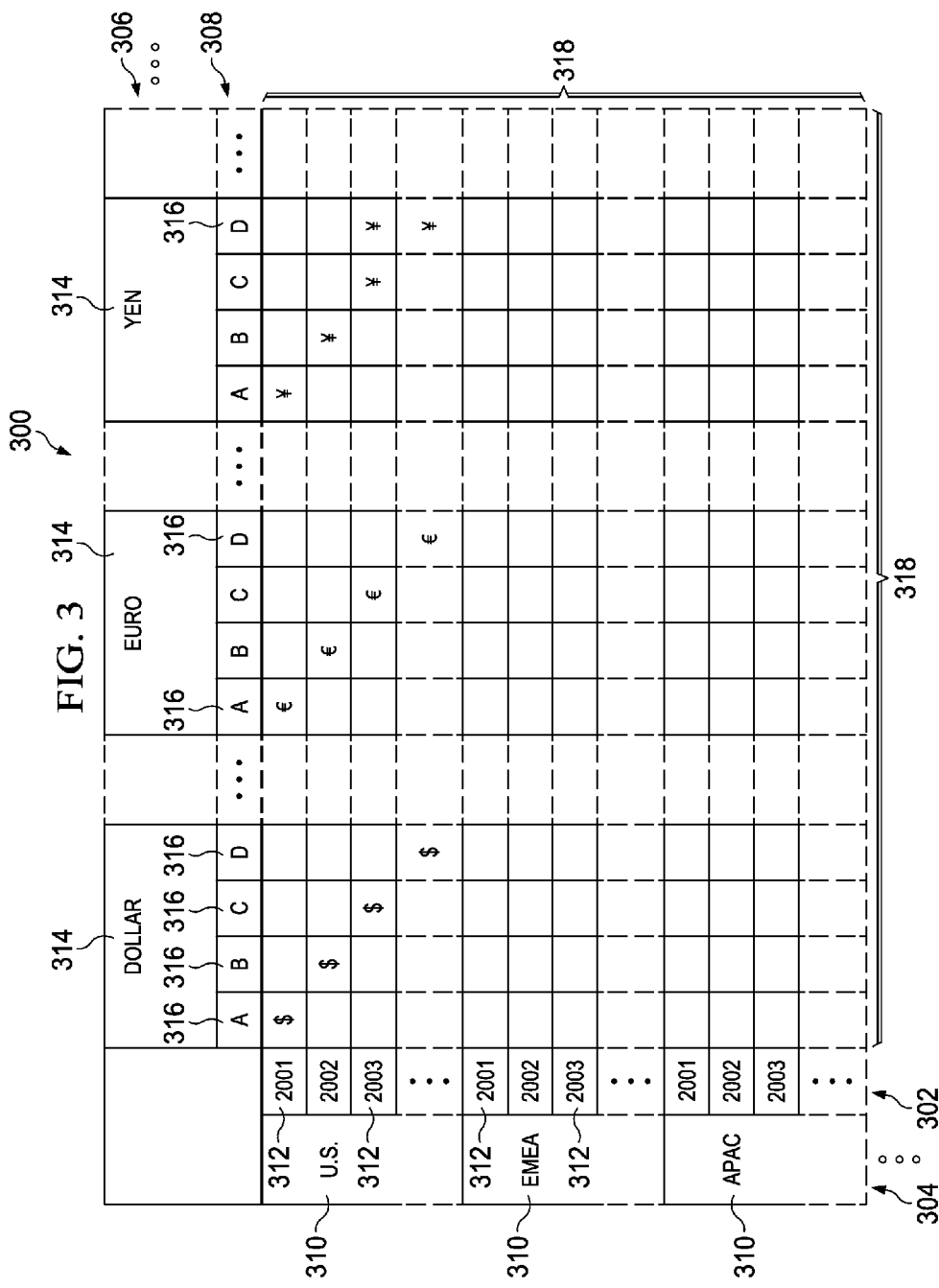
FIG. 3 illustrates an example data object including business data to be displayed on a mobile device.

In some embodiments, the data object 125, e.g., as a crosstab, can have stacked dimensions. For example, the number of dimensions defining an axis can be one, two, or more. Stacked dimensions on an axis may resemble a partial outer product where the inner dimension's members are repeated within each member of the outer dimension, such as is shown in FIG. 3.

The environment further includes repository 130, the repository 130 can be a cloud-based storage medium. For example, the repository 130 can be networked online storage where data is stored on virtualized pools of storage.

The illustrated environment of FIG. 1 also includes one or more clients 135 and the mobile device 110. Each client 135 and/or the mobile device 110 may be any computing device operable to connect to or communicate with at least the computing system 10 and/or via the network 115 using a wireline or wireless connection. In general, each client 135 and/or the mobile device 110 comprises an electronic computer device operable to receive, transmit, process, and store any appropriate data associated with the environment 100 of FIG. 1.

There may be any number of clients 135 and/or mobile devices 110 associated with, or external to, the environment 100. For example, while the illustrated environment 100 includes three clients 135 and four mobile devices 110$a$-110$d$, alternative implementations of environment 100 may include a single client 135 or mobile device 110 communicably coupled to the server 102 and/or the network 115, or any other number suitable to the purposes of the environment 100.

Additionally, there may also be one or more additional clients and/or mobile devices external to the illustrated portion of environment 100 that are capable of interacting with the environment 100 via the network 115. Further, the term "client" and "user" may be used interchangeably as appropriate without departing from the scope of this disclosure. Moreover, while each client 135 and/or the mobile device 110 is described in terms of being used by a single user, this disclosure contemplates that many users may use one computer, or that one user may use multiple computers. As used in this disclosure, the client 135 is intended to encompass a personal computer, touch screen terminal, workstation, network computer, kiosk, one or more processors within these or other devices, or any other suitable processing device.

The illustrated mobile device 110 is intended to encompass any mobile computing device such as a wireless data port, smart phone, personal data assistant (PDA), tablet computing device, cell phone, one or more processors within these devices, or any other suitable processing device. For example, each client 135 and the mobile device 110 may comprise a computer that includes an input device, such as a keypad, touch screen, mouse (in the client 135 example), or other device that can accept user information, and an output device that conveys information associated with the operation of the computing system 102 or the client 135 or the mobile device 100 itself, including digital data, visual information, or a graphic user interface (GUI), as shown with respect to the mobile device 110. In the example of the clients 135, both the input and output device may include fixed or removable storage media such as a magnetic storage media, CD-ROM, or other suitable media to both receive input from and provide output to users of the clients 135 through the display.

Further, the mobile device 110*d* (and other mobile devices 110) includes a GUI 113 to interface with at least a portion of the environment 100 for any suitable purpose, including generating a visual representation of a web browser. Generally, through the GUI 113, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 113 can represent any graphical user interface, including but not limited to, a web browser, touch screen, or command line interface (CLI) that processes information in the environment 100 and efficiently presents the information results to the user. In general, the GUI 113 may include a plurality of user interface (UI) elements, some or all associated with a web browser, such as interactive fields, pull-down lists, and buttons operable by the user at the mobile device 113. These and other UI elements may be related to or represent the functions of the web browser. In particular, the GUI 113 may be used to view and navigate various web pages located both internal and external to the server.

Figure 2:
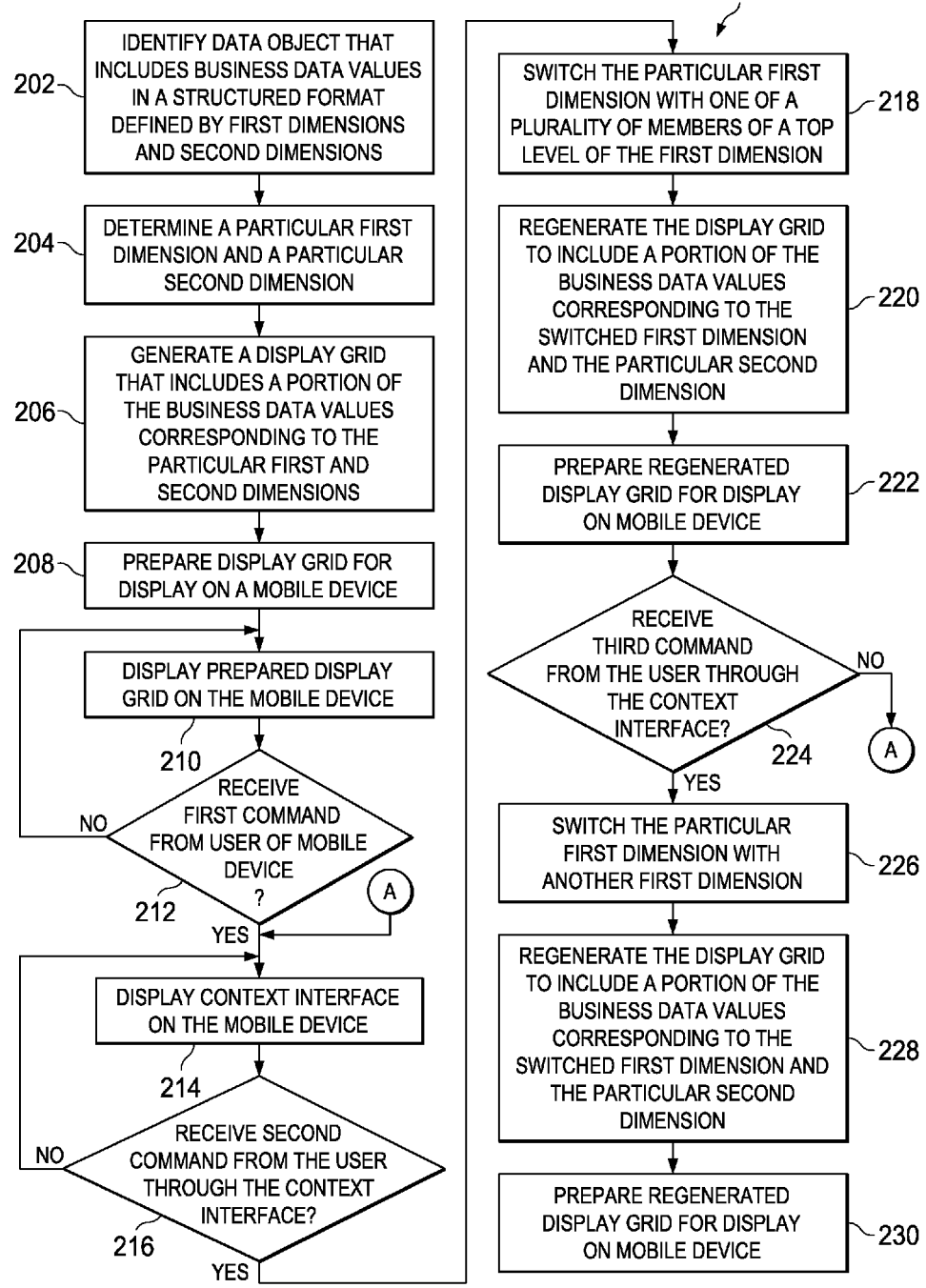
FIG. 2 illustrates an example method for managing data content on a mobile device.

FIG. 2 illustrates an example method 200 for managing data content on a mobile device. In some embodiments, method 200 (and other methods described herein) may be implemented with or by, for instance, the data focus module 104 executable on one or both of a server system (e.g., computing system 102) and a client system (e.g., mobile device 110). Although the example method 200 includes steps 202 through 230, one or more of the illustrated steps may be optional. Further, steps in addition to those illustrated in method 200 may be included without departing from the scope of this disclosure. As one example, although method 200 shows some steps (e.g., steps 212, 216, 224) as occurring once, such steps may occur multiple instances during execution of method 200 or other similar methods.

In step 202, business data values, for example, in one or more data objects that includes the business data values in a structured format defined by one or more first dimensions (e.g., vertical dimensions) and one or more second dimensions (e.g., horizontal dimensions), are identified. For example, in some implementations, the data object(s) may be stored (e.g., in memory 120) on the mobile device (or other computing device that executes the method 200). In some implementations, the data object(s) may be accessible to the mobile device on another computing system, such as, for example, stored on the repository 130, computing system 102, or other apparatus and accessible through the network 115. In some implementations, the data object may be received at the mobile device, such as through an email, text, or other electronic communication system.

Turning briefly to FIG. 3, an example data object 300 is illustrated that includes business data. As described above, in some embodiments, the data object may be a crosstab, which is illustrated as data object 300. Data object 300, as illustrated, is a multidimensional crosstab that includes data values 318 in cells that correspond to multiple dimensions on both a vertical axis and a horizontal axis. As illustrated, the horizontal axis includes dimension 306 and dimension 308, with dimension 306 defining a currency type (e.g., U.S. dollar, euro, yen) and dimension 308 defining a product type (e.g., product A, product B, product C). Dimension 306 includes members 314, each of which defines a particular currency type. Dimension 308 includes members 316, each of which defines a particular product type. As illustrated, members 316 may refer to a variety of products, here product A, product B, product C, product D, and others, as shown. Likewise, members 314 may refer to a variety of currencies, here U.S. dollar, euro, yen, and others, as shown.

The vertical axis includes dimensions 302 and 304, with dimension 302 defining a time duration (e.g., year) and dimension 304 defining a geographic area (e.g., U.S., EMEA, APAC). Dimension 302 includes members 312, each of which defines a particular year. Dimension 304 includes members 310, each of which defines a particular geographic area. As illustrated, members 312 may include different years, such as the years 2001, 2002, 2003, and additional years as shown.

The data values 318 each reside at an intersection of a row and a column of the crosstab. The cell typically includes value that corresponds to the intersection of the members that define it. The value is an aggregation of a measure for the table.

As noted, the data object 300 is a multidimensional crosstab in that each axis has "stacked" dimensions. For example, dimension 306 is stacked upon dimension 308 and is thus an outer dimension while dimension 308 is an inner dimension. Dimension 304 is stacked upon dimension 302 and is also an outer dimension while dimension 302 is an inner dimension. Stacked dimensions on an axis resemble a partial outer product where the inner dimension's members (e.g., members 316 of dimension 308 and members 312 of dimension 302) are repeated within each member of the outer dimension (e.g., members 314 of dimension 306 and members 310 of dimension 304). In the illustrated example, the data object 300 is a crosstab with four dimensions—two on the vertical axis and two on the horizontal axis. Other example data objects may have more or fewer dimensions on each axis.

In step 204, a particular first dimension (e.g., from the one or more first dimensions) and a particular second dimension (e.g., from the one or more second dimensions) are determined. For example, with reference to the data object 300, the first dimensions may be the dimensions 302 and 304 on the vertical axis while the second dimensions may be the dimensions 306 and 308 on the horizontal axis. Determination of particular first and second dimensions may be done in a variety of ways. For example, a user may specify the particular first dimension of several dimensions and the particular second dimension of several dimensions. As another example, in some implementations, if it is determined (e.g., by the data focus module) that a particular axis includes a single dimension, then the particular dimension by default is the single dimension.

In some embodiments, the data focus module may determine the particular dimensions based on the outer and inner dimensions of a stacked crosstab arrangement. For example, an outer level first dimension and an inner level first dimension may be determined. For example, with reference to the data object 300, the outer level dimension may be the dimension 304 while the inner level dimension is dimension 302. As illustrated, members 312 of the inner level dimension make up a subset of each particular member 310 of the outer level dimension. Thus, the particular first dimension can be set as the inner level dimension, e.g., dimension 302. This process can be repeated for to determine that the particular second dimension is to be set as the dimension 308 on the horizontal axis of the data object 300.

In step 206, a display grid that includes a portion of the business data values corresponding to the particular first and second dimensions is generated, e.g., by the data focus module. In step 208, the generated display grid is prepared for display on the mobile device (e.g., a smartphone, PDA, tablet, cell phone, or otherwise) and displayed on the mobile device in step 210.

Figure 4:
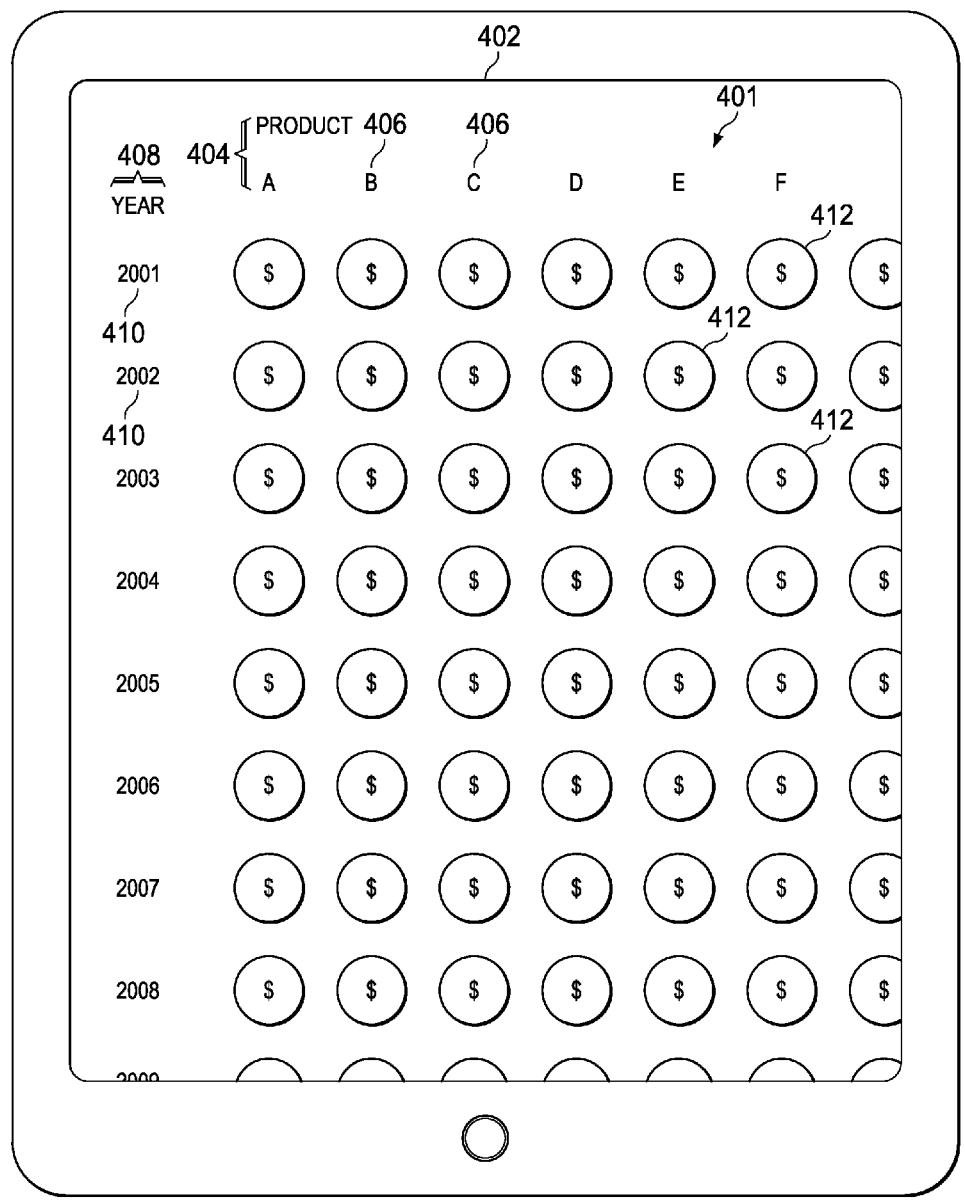
FIG. 4 illustrates an example mobile device displaying a modified view of a portion of business data.

Turning briefly to FIG. 4, this figure illustrates an example mobile device 400 displaying an example display grid 401 generated from the data object 300. In this example, the mobile device 400 is a table computing device that includes a touchscreen GUI 402. As illustrated, the display grid 401 includes a horizontal dimension 404 that includes members 406 and a vertical dimension 408 that includes members 410. In this example, the horizontal dimension 404 corresponds to the dimension 308 in data object 300 (e.g., the inner dimension) while dimension 408 corresponds to the dimension 302. Members 406 correspond to members 316 (e.g., product types) while members 410 correspond to members 312 (e.g., years). Display grid 400 also includes values 412 that correspond to the values 318 in cells at the intersection of particular members 406 and 410.

In step 212, a determination is made whether a first command is received from the user at the mobile device (e.g., through contact of the user on the touchscreen GUI 402 of the mobile device 400). If yes, then a context interface is displayed on the mobile device (e.g., on the touchscreen GUI 402) in step 214. If no, then the display grid is displayed in step 210.

Turning to FIG. 5A, an example context interface 500 is illustrated on the touchscreen GUI 402 of the mobile device 400. The example context interface 500, as illustrated, includes a center portion 502 that represents and/or includes a particular value 412 in the display grid 500, a first interface region 504, a second interface region 506, a third interface region 508, and a fourth interface region 510. Although illustrated as a pie menu with rings the multiple interface regions formed as rings, other implementations of the context interface 500, e.g., in different shapes, are also contemplated by the present disclosure. For example, the context interface may contain squares for cells and stacked bars containing menus as a possible alternative. The pie menu, however, may offer a natural contrast to the grid 500 for visual distinction for the user, hence it helps to separate measurements and navigational information.

For example, in some embodiments, the context interface 500 may include drop down menus rather than a pie menu. For instance, each of the interface regions (e.g., regions 504 through 510) may be a separate drop down menu that exposes the particular dimensions or members when selected. As another example, the context interface 500 may be a grid menu rather than a pie menu. As a grid menu, certain axis can correspond to certain interface regions, for example. As another example, activation and manipulation of the context interface may respond to voice commands to, for instance, expose the interface, switch dimensions, switch members, and other actions.

In the illustrated embodiment, the center portion 502 may represent a particular value 412 that the user selected (e.g., through the touchscreen GUI 402) in order to activate the context interface 500. The first interface region 504, in this example, represents the currently displayed first dimension 408 (e.g., the vertical axis dimension), while the second interface region 506 represents the currently displayed second dimension 404 (e.g., the horizontal axis dimension). The third and fourth interface regions 508 and 510, in this example, represent particular muted dimensions, e.g., dimensions that are part of the data object 300 but not currently displayed in the display grid 401. For example, as shown, the interface region 508 corresponds to the dimension 304 of the data object 300 and members 512 (e.g., America or U.S., EMEA, APAC) correspond to the particular members 310. Further, the interface region 510 corresponds to the dimension 306 of the data object 300 and members 514 (e.g., U.S. dollar, euro, yen) correspond to the particular members 316.

As further illustrated in FIG. 5A, the selected member 512 of the interface region 508 is "America," while the selected member 514 of the interface region 510 is "U.S. Dollar." In the illustrated example, the selected members are bolded to show their selection. However, other forms of emphasis to show selection as contemplated by the present disclosure, such as, for example, underlining, highlighting, different coloring, and visual techniques such as blinking Thus, the display grid 500 includes values 412 that correspond to product sales of various products (e.g., A, B, C, and D) in the chosen geographical region (e.g., America) in the chosen currency (e.g., U.S. dollar), for the various years (e.g., 2001).

Moreover, other techniques for indicating to the user that a particular member is selected are possible. For instance, in some embodiments, a particular selection angle (e.g., a particular position, or heading, in a 360 degree ring of a pie menu context interface) may indicate a selection of a member. In one example, the selection angle may always point in a direction from the vertex of the pie menu context interface to a center of the display grid, regardless of the location of the pie menu on the display. For example, if the pie menu context interface appears in an upper left part of the display grid, the selection angle will point in the direction of the bottom right of the pie menu (e.g., towards the center of the display grid). Members that are aligned along that selection angle, therefore, are the selected members.

In step 216, a determination is made whether a second command is received from the user at the mobile device. For example, in some implementations, the second command may be rotational contact by the user on a portion of the context interface 500, e.g., at or near one of the interface regions 508 or 510. For instance, the user may rotate one of the third or fourth interface regions 508 or 510 to select a different member than the currently selected member. If yes, then the particular member of the first dimension that is currently selected (e.g., dimension 408) is switched with a member of a muted dimension in step 218. For example, as illustrated in FIG. 3, the particular member of the first dimension that is currently selected prior to the switch may be the dimension 302 corresponding to years (e.g., members 312).

The muted dimension may be dimension 304 (e.g., geographic areas) that include members 310 (e.g., U.S., EMEA, APAC, and others).

Thus, when a user initiates the context interface, e.g., by selecting a particular data cell of the display grid, the user is selecting an intersection of all dimensions (e.g., both muted and displayed) in the data object (e.g., data object 300). Once the context interface appears and the user selects a member of a muted dimension (e.g., by rotating a particular interface region of the context interface), as described above, then the display grid is regenerated. Particularly, in some embodiments, the display grid is regenerated based on the selected data cell that defines an intersection of a particular horizontal and a particular vertical dimension (e.g., the dimensions currently displayed), as well as the newly selected, or switched to, muted dimension. The newly selected muted dimension then replaces one of the particular horizontal or vertical displayed dimension and the member of the replaced dimension that was selected by the user (e.g., at the intersection) now becomes the selected member of the newly muted dimension.

The display grid is then regenerated to include a portion of the business data values corresponding to the switched first dimension and the particular second dimension in step 220 and prepared for display in step 222. Thus, in this example embodiment, the display grid is regenerated using the members of the muted dimension that was selected by switching to the member. If the determination is no in step 216, then the display grid and context interface continues to be displayed in step 214.

Figure 5B:
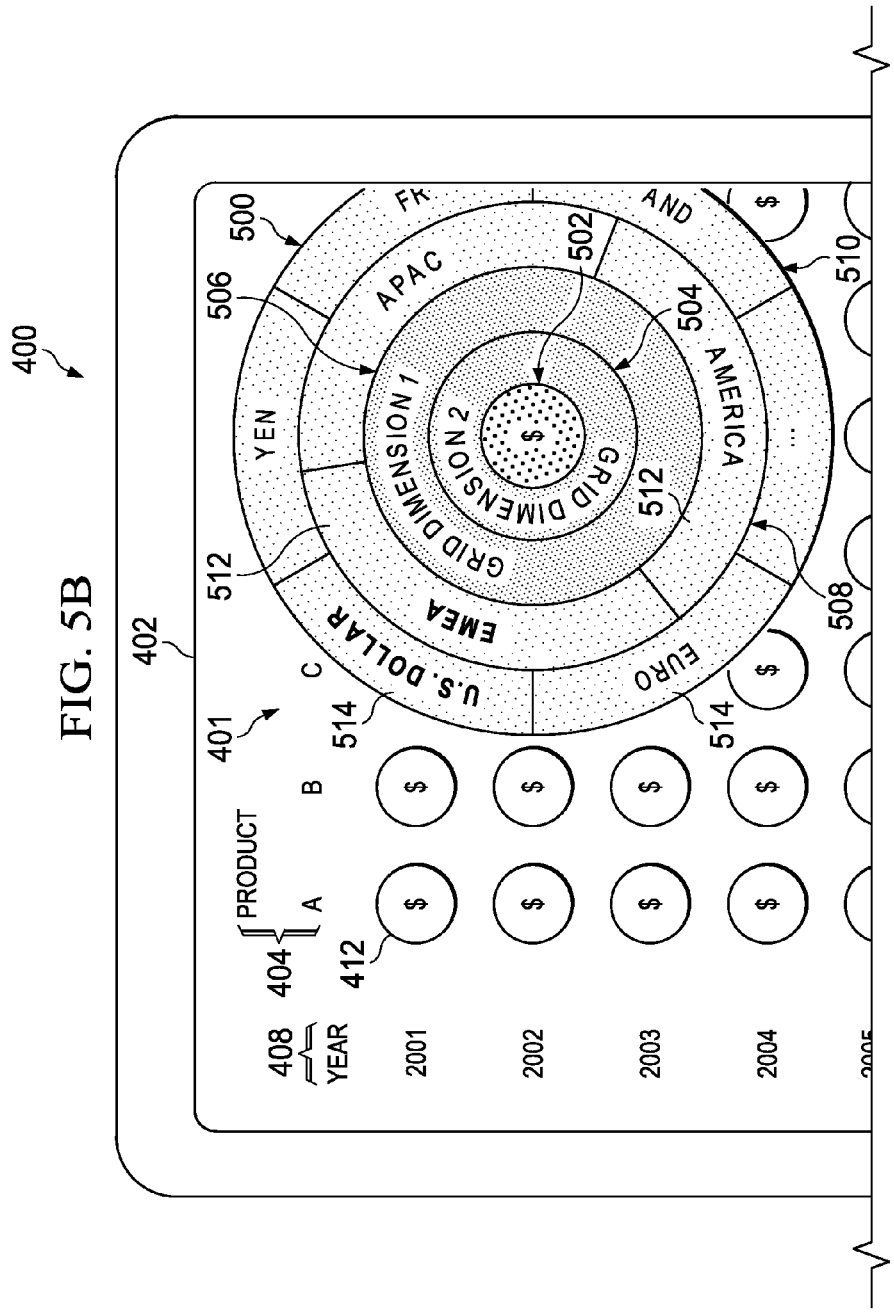

Turning to FIG. 5B, this figure illustrates the regenerated display grid after step 220 is performed. As illustrated in this example, the third interface region 508 has been rotated by the user so that the particular member 512 labeled "EMEA" is selected and, therefore, bolded to show its selection. Other forms of emphasis, however, to show selection of the particular member, may also be utilized (e.g., underlined, different color, highlighted, blinking, and others). As one example, and mentioned above, a user gesture to manipulate an interface region (e.g., region 508) to switch a particular member may include rotation of the interface region. Other user gestures (e.g., tap, double-tap, click, swipe, and others) may also be used to switch the particular member. Rotation of a ring-shaped interface region, such as the illustrated interface region 508, may allow a user to easily manipulate the context interface 500 in this example.

Thus, instead of the display grid 500 displaying values 412 that correspond to product sales of various products (e.g., A, B, C, and D) in the chosen geographical region of America in the chosen currency of U.S. dollar for the various years (e.g., 2001), the display grid 500 in FIG. 5B displays values 412 that correspond to product sales of various products (e.g., A, B, C, and D) in the chosen geographical region of EMEA in the chosen currency of U.S. dollar for the various years (e.g., 2001).

In step 224, a determination is made whether a third command is received from the user at the mobile device. For example, in some implementations, the second command may be "pinching" contact by the user on a portion of the context interface 500, e.g., at or near one of the interface regions 508 or 510. For instance, the user may pinch one of the third or fourth interface regions 508 or 510 and drag the pinched region to one of the first or second interface regions 504 or 506 in order to select a different dimension than the currently selected dimension defined by the region 504 or 506. Other user gestures (e.g., tap, double-tap, click, swipe, and others) may also be used to select a different dimension. "Pinching" may include the user contacting nearly opposite sides of the ring-shaped interface region (e.g., 508 or 510) with a thumb and forefinger and moving those fingers together toward an inner interface region (e.g., region 504 or 506).

If yes, then the particular first dimension currently selected (e.g., dimension 408) is switched with the muted dimension represented by the pinched region in step 226. The display grid is then regenerated to include a portion of the business data values corresponding to the switched first dimension and the particular second dimension in step 228 and prepared for display on the mobile device in step 230. If no, then the display grid and context interface continues to be displayed in step 214.

Figure 5C:
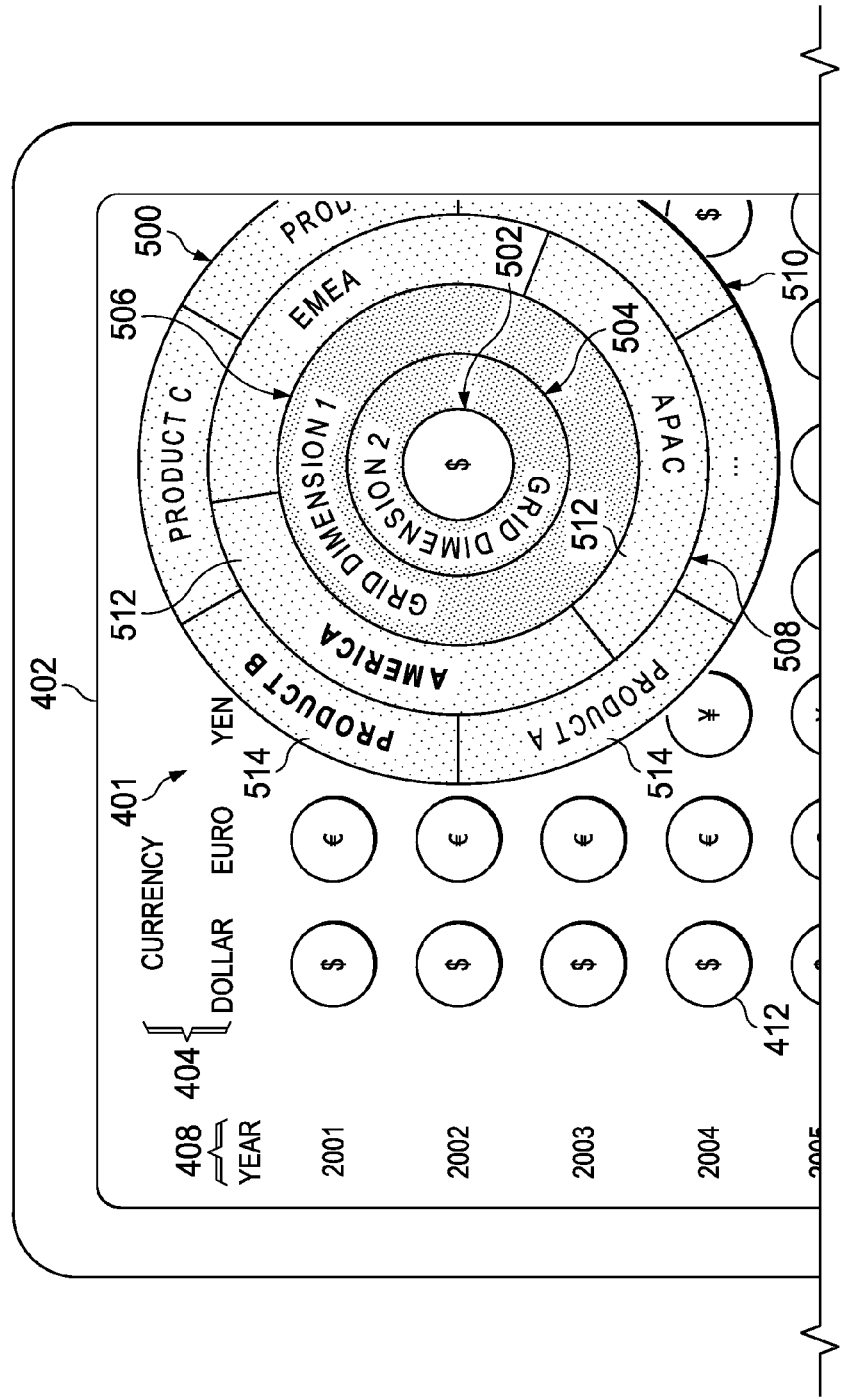

Turning to FIG. 5C, this figure illustrates the regenerated display grid after step 228 is performed. In this example, the fourth interface region 510 has been pinched by the user and dragged to the first interface region 504. Thus, the dimension 306 has been swapped for the dimension 308 in the data object 300 by this user command. The display grid 500 then displays values 412 that correspond to a particular product (e.g., Product B is selected in this example and therefore bolded to show selection) in the selected geographical region of America (e.g., bolded to show selection) in the various currencies (e.g., dollar, euro, yen) for the various years (e.g., 2001) in FIG. 5C.

A number of implementations have been described. Nevertheless, it will be understood that various modifications may be made. For example, other methods described herein besides those or in addition to that illustrated in FIG. 2 may be performed. Further, the illustrated steps of method 200 may be performed in different orders, either concurrently or serially. Further, steps may be performed in addition to those illustrated in method 200, and some steps illustrated in method 200 may be omitted without deviating from the present disclosure.

As specific example, although certain user actions have been described with reference to particular functionality (e.g., rotations of a context interface, pinching of a context interface), other actions are contemplated. Moreover, certain described actions may implement functionality (e.g., of the data focus module) than that described. For instance, various user gestures may be supported. A user may touch to select a cell or specifically to select the intersection of the two dimensions currently part of the grid to open the context interface. A user may rotate a portion of the interface to select another member or dimension in the context interface. A user may pinch or drag certain interface areas of the context interface to swap the dimensions or members displayed in the grid. A user may swipe the grid to view all rows and columns (e.g., to pan to another portion of the display grid). Functionality such as zoom may also be incorporated into the user gestures. Accordingly, other implementations are within the scope of the following claims.

What is claimed is:

1. A method performed with a computing system for managing content on a computing device, the method comprising:
   identifying a data object comprising business data values defined in a structured format, the structured format comprising the business data values defined by two or more first dimensions and two or more second dimensions;
   determining a particular first dimension and a muted first dimension of the two or more first dimensions and a particular second dimension and a muted second dimension of the two or more second dimensions, the determining comprising:

determining an outer level first dimension as one of the two or more first dimensions, the outer level first dimension comprising a plurality of members;

determining an inner level first dimension as one of the two or more first dimensions, the inner level first dimension comprising a plurality of members that comprise a subset of the outer level first dimension;

setting the inner level first dimension as the particular first dimension, and the outer level first dimension as the muted first dimension;

determining an outer level second dimension as one of the two or more second dimensions, the outer level second dimension comprising a plurality of members;

determining an inner level second dimension as one of the two or more second dimensions, the inner level second dimension comprising a plurality of members that comprise a subset of the outer level second dimension;

setting the inner level second dimension as the particular second dimension, and the outer level second dimension as the muted second dimension;

generating a display grid for display on a computing device, the display grid comprising a portion of the business data values corresponding to the particular first dimensions the particular second dimension, the muted first dimension, and the muted second dimension, wherein the display of the generated display grid is independent of the muted first dimension and the muted second dimension;

preparing the display grid for display on the computing device;

receiving a first command from the user of the computing device through the context interface;

in response to receiving the first command:
  determining the outer level first dimension as the other one of the two or more first dimensions to provide an updated outer level first dimension,
  setting the updated outer level first dimension as the particular first dimension and the inner level first dimension as the muted first dimension;
regenerating the display grid for display on the computing device, the display grid comprising a portion of the business data values corresponding to the swi-tehed particular first dimension the particular second dimension, the muted first dimension, and the muted second dimension, wherein the display of the regenerated display grid is independent of the muted first dimension and the muted second dimension; and
preparing the regenerated display grid for display on the computing device.

2. The method of claim 1, wherein the computing device comprises a mobile device that comprises one of a smartphone, a tablet, a PDA, or a cellular phone.

3. The method of claim 1, further comprising:
receiving a second command from the user of the computing device;
in response to receiving the second command, displaying a context interface on the computing device, the context interface comprising the particular first and second dimensions and at least a portion of the plurality of members of the outer level first dimension and at least a portion of the plurality of members of the outer level second dimension.

4. The method of claim 3, further comprising:
receiving a third command from the user of the computing device through the context interface;

in response to receiving the third command, switching the particular first dimension with one of the plurality of members of the outer level first dimension;
regenerating the display grid for display on the computing device, the display grid comprising a portion of the business data values corresponding to the switched first dimension, the particular second dimension, the muted first dimension, and the muted second dimension; and
preparing the regenerated display grid for display on the computing device.

5. The method of claim 4, wherein receiving a third command from the user of the computing device through the context interface comprises receiving rotational contact on a touchscreen at or near a portion of the context interface.

6. The method of claim 3, wherein receiving a second command comprises receiving contact on a touchscreen of the computing device at or near a particular business data value displayed in the display grid, and the context interface comprises a pie menu interface that comprises:
  a center portion that comprises the particular business data value;
  a first ring that circumscribes the center portion and comprises the particular first dimension;
  a second ring that circumscribes the first ring and comprises the particular second dimension; and
  a third ring that circumscribes at least one of the first and second rings and comprises one of the first dimensions other than the particular first dimension.

7. The method of claim 1, wherein receiving a first command from the user of the computing device through the context interface comprises receiving pinching contact on a touchscreen at or near a portion of the context interface toward a center of the context interface.

8. The method of claim 1, wherein the one or more second dimensions comprise two or more second dimensions.

9. The method of claim 1, wherein generating the display grid for display on the computing device further comprises generating the display grid including a horizontal dimension that corresponds to the particular first dimension that comprises the inner level first dimension and a vertical dimension that corresponds to the particular second dimension that comprises the inner level second dimension.

10. The method of claim 9, wherein regenerating the display grid for display on the computing device further comprises regenerating the display grid including the horizontal dimension that corresponds to the particular first dimension that comprises the updated outer level first dimension and the vertical dimension that corresponds to the particular second dimension that comprises the inner level second dimension.

11. A non-transitory computer storage medium encoded with a computer program, the program comprising instructions that when executed by one or more computers cause the one or more computers to perform operations comprising:
  identifying a data object comprising business data values defined in a structured format, the structured format comprising the business data values defined by two or more first dimensions and two or more second dimensions;
  determining a particular first dimension and a muted first dimension of the two or more first dimensions and a particular second dimension and a muted second dimension of the two or more second dimensions, the determining comprising:
    determining an outer level first dimension as one of the two or more first dimensions, the outer level first dimension comprising a plurality of members;

determining an inner level first dimension as one of the two or more first dimensions, the inner level first dimension comprising a plurality of members that comprise a subset of the outer level first dimension;

setting the inner level first dimension as the particular first dimension, and the outer level first dimensions as the muted first dimension;

determining an outer level second dimension as one of the two or more second dimensions, the outer level second dimension comprising a plurality of members;

determining an inner level second dimension as one of the two or more second dimensions, the inner level second dimension comprising a plurality of members that comprise a subset of the outer level second dimension;

setting the inner level second dimension as the particular second dimension, and the outer level second dimension as the muted second dimension;

generating a display grid for display on a computing device, the display grid comprising a portion of the business data values corresponding to the particular first dimensions the particular second dimension, the muted first dimension, and the muted second dimension, wherein the display of the generated display grid is independent of the muted first dimension and the muted second dimension;

preparing the display grid for display on the computing device;

receiving a first command from the user of the computing device through the context interface;

in response to receiving the first command:
  determining the outer level first dimension as the other one of the two or more first dimensions to provide an updated out level first dimension,
  setting the updated outer level first dimension as the particular first dimension, and the inner level first dimension as the muted first dimension;
  regenerating the display grid for display on the computing device, the display grid comprising a portion of the business data values corresponding to the particular first dimensions the particular second dimension, the muted first dimension, and the muted second dimension, wherein the display of the regenerated display grid is independent of the muted first dimension and the muted second dimension; and
  preparing the regenerated display grid for display on the computing device.

12. The computer storage medium of claim 11, wherein the computing device comprises a mobile device that comprises one of a smartphone, a tablet, a PDA, or a cellular phone.

13. The computer storage medium of claim 11, wherein the operations further comprise:
  receiving a second command from a user of the computing device;
  in response to receiving the second command, causing a context interface to be displayed on the computing device, the context interface comprising the particular first and second dimensions and at least a portion of the plurality of members of the outer level first dimension and at least a portion of the plurality of members of the outer level second dimension.

14. The computer storage medium of claim 13, wherein the operations further comprise: receiving a third command from the user of the computing device through the context interface;
  in response to receiving the third command, switching the particular first dimension with one of the plurality of members of the outer level first dimension; regenerating the display grid for display on the computing device, the display grid comprising a portion of the business data values corresponding to the switched first dimension, the particular second dimension, the muted first dimensions, and the muted second dimensions; and
  preparing the regenerated display grid for display on the computing device.

15. The computer storage medium of claim 14, wherein receiving a third command from the user of the computing device through the context interface comprises determining that rotational contact on a touchscreen occurs at or near a portion of the context interface.

16. The computer storage medium of claim 13, wherein receiving a second command comprises receiving contact on a touchscreen of the computing device at or near a particular business data value displayed in the display grid, and
  the context interface comprises a pie menu interface that comprises:
    a center portion that comprises the particular business data value;
    a first ring that circumscribes the center portion and comprises the particular first dimension;
    a second ring that circumscribes the first ring and comprises the particular second dimension; and
    a third ring that circumscribes at least one of the first and second rings and comprises one of the first dimensions other than the particular first dimension.

17. The computer storage medium of claim 11, wherein receiving a second command from the user of the computing device through the context interface comprises determining that pinching contact on a touchscreen occurs at or near a portion of the context interface toward a center of the context interface.

18. The computer storage medium of claim 11, wherein the one or more second dimensions comprise two or more second dimensions.

19. A system of one or more computers configured to perform operations comprising:
  identifying a data object comprising business data values defined in a structured format, the structured format comprising the business data values defined by two or more first dimensions and two or more second dimensions;
  determining a particular first dimension and a muted first dimension of the two or more first dimensions and a particular second dimension and a muted second dimension of the two or more second dimensions, the determining comprising:
    determining an outer level first dimension as one of the two or more first dimensions, the outer level first dimension comprising a plurality of members;
    determining an inner level first dimension as one of the two or more first dimensions, the inner level first dimension comprising a plurality of members that comprise a subset of the outer level first dimension;
    setting the inner level first dimension as the particular first dimension, and the outer level first dimension as the muted first dimension;
    determining an outer level second dimension as one of the two or more second dimensions, the outer level second dimension comprising a plurality of members;
    determining an inner level second dimension as one of the two or more second dimensions, the inner level second dimension comprising a plurality of members that comprise a subset of the outer level second dimension;

setting the inner level second dimension as the particular second dimension, and the outer level second dimension as the muted second dimension;

generating a display grid for display on a computing device, the display grid comprising a portion of the business data values corresponding to the particular first dimensions the particular second dimension, the muted first dimension, and the muted second dimension, wherein the display of the generated display grid is independent of the muted first dimension and the muted second dimension;

preparing the display grid for display on the computing device;

receiving a first command from the user of the computing device through the context interface;

in response to receiving the first command:

determining the outer level first dimension as the other one of the two or more first dimensions to provide an updated outer level first dimension, setting the updated outer level first dimension as the particular first dimension, and the inner level first dimension as the muted first dimension;

regenerating the display grid for display on the computing device, the display grid comprising a portion of the business data values corresponding to the particular first dimensions the particular second dimension, the muted first dimensions, and the muted second dimension, wherein the display of the regenerated display grid is independent of the muted first dimension and the muted second dimension; and preparing the regenerated display grid for display on the computing device.

20. The system of claim 19, wherein the computing device comprises a mobile device that comprises one of a smartphone, a tablet, a PDA, or a cellular phone.

21. The system of claim 19, wherein the operations further comprise:

receiving a second command from a user of the computing device;

in response to receiving the second command, causing a context interface to be displayed on the computing device, the context interface comprising the particular first and second dimensions and at least a portion of the plurality of members of the outer level first dimension and at least a portion of the plurality of members of the outer level second dimension.

22. The system of claim 21, wherein the operations further comprise:

receiving a third command from the user of the computing device through the context interface;

in response to receiving the third command, switching the particular first dimension with one of the plurality of members of the outer level first dimension;

regenerating the display grid for display on the computing device, the display grid comprising a portion of the business data values corresponding to the switched first dimension, the particular second dimension, the muted first dimension, and the muted second dimensions; and preparing the regenerated display grid for display on the computing device.

23. The system of claim 22, wherein receiving a third command from the user of the computing device through the context interface comprises determining that rotational contact on a touchscreen occurs at or near a portion of the context interface.

24. The system of claim 21, wherein receiving a second command comprises receiving contact on a touchscreen of the computing device at or near a particular business data value displayed in the display grid, and the context interface comprises a pie menu interface that comprises:

a center portion that comprises the particular business data value;

a first ring that circumscribes the center portion and comprises the particular first dimension;

a second ring that circumscribes the first ring and comprises the particular second dimension; and a third ring that circumscribes at least one of the first and second rings and comprises one of the first dimensions other than the particular first dimension.

25. The system of claim 19, wherein receiving a second command from the user of the computing device through the context interface comprises determining that pinching contact on a touchscreen occurs at or near a portion of the context interface toward a center of the context interface.

26. The system of claim 19, wherein the one or more second dimensions comprise two or more second dimensions.

* * * * *